United States Patent Office 3,086,989
Patented Apr. 23, 1963

3,086,989
DIBASIC ACID FROM PHOTOLEVOPIMARIC ACID
Walter H. Schuller and Ray V. Lawrence, Lake City, Fla.,
assignors to the United States of America as represented
by the Secretary of Agriculture
No Drawing. Filed Dec. 14, 1961, Ser. No. 159,468
6 Claims. (Cl. 260—514)
(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the dibasic acid obtained from photolevopimaric acid. The structure of this dibasic acid is (I).

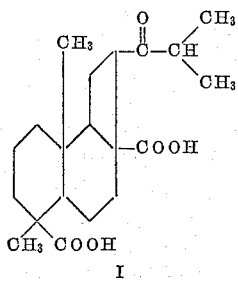

I

It exhibits $[\alpha]_D^{25}$ +63.7°, $M_D$ +224.

This dibasic acid is preferentially prepared by the ozonolysis of photolevopimaric acid in which the ozonide is oxidatively decomposed with chlorine. The structure of photolevopimaric acid is (II).

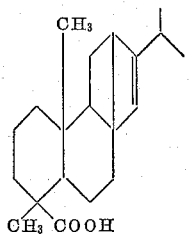

II

The ozonization of photolevopimaric acid is preferably carried out in absolute methanol at a sufficiently low temperature to minimize side reactions. The oxidative decomposition of the ozonide is preferably carried out in aqueous methanol at about 0° C. by the introduction of an excess of chlorine gas. Isolation of the dibasic acid in excess of 85% yields is carried out by vacuum distillation of the alcohol present, whereupon the dibasic acid crystallizes out of solution.

The dibasic acid (I) is useful in the preparation of styrenated polyester laminating resins of the maleic (or fumaric) acid-glycol-dibasic acid modifier type, cross linked with styrene in the presence of a peroxide initiator. The ready availability of levopimaric acid in pine gum, the ease of conversion to photoevopimaric acid by simple exposure to sunlight, and the present availability of large scale industrial ozonization facilities, makes the instant dibasic acid (I) of considerable commercial interest in the rapidly expanding field of polyester resins, being superior in certain respects to the present commercially used dibasic acid modifiers such as phthalic acid, isophthalic acid, and adipic acid.

While it was previously known that levopimaric acid underwent a change in rotation when exposed to ultraviolet light, there was no information on the nature of the transformation occurring or the nature of the product or products formed and the properties of same [K. Kraft, Ann., 520, 133 (1935); H. Wienhaus, H. Ritter, and W. Sandermann, Ber., 69B, 2198 (1936)]. We have found that irradiation of levopimaric acid in ethanol yields photolevopimaric acid which after isolation, crystallization, and purification, exhibits $[\alpha]_D^{25}$ +79.2° (c.=1% in 95% ethanol), $M_D$ +240, the structure of which we have demonstrated to be that of II above. Photolevopimaric acid when heated at or above its melting point of 114.5–115° C. is converted back to the starting levopimaric acid. It was found that by hydrogenating the 7,8-double bond, the saturated diastereomers III and IV obtained

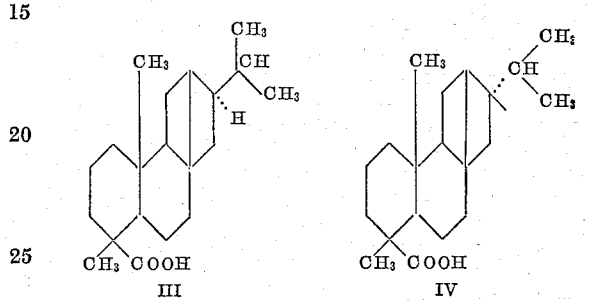

III            IV are of very much improved thermal stability.

The hydrogenation of photolevopimaric acid is preferably carried out in neutral solution, in a solvent such as absolute ethanol, at atmospheric pressure, and in the presence of a suitable catalyst such as palladium-on-carbon.

Photolevopimaric acid is preferentially prepared by the irradiation of an ethanol solution of levopimaric acid with ultraviolet light of wave length 250–370 mµ. The structure of levopimaric acid is V [numbering system according to W. Klyne, J. Chem. Soc., 3072 (1953)]. The preferred solvent for the

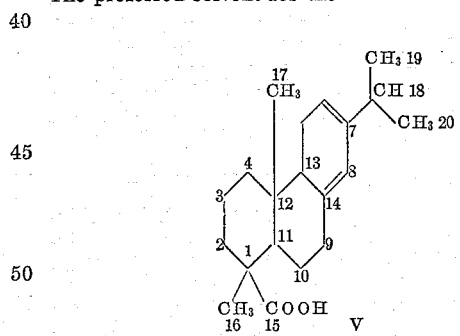

V reaction is absolute ethanol although other solvents such as hexane, benzene, and diethyl ether can be employed. The wavelength that is important to the reaction is equivalent to the region of maximum absorption of levopimaric acid, namely from about 262–282 mµ or more specifically, 272 mµ, which is the peak of the absorption curve. Photolevopimaric acid is isolated in crude yields up to 81% by the judicious addition of water to the ethanolic reaction mixture. It is preferred that the irradiation is carried out until no further change in specific rotation or of the ultraviolet absorption spectrum of the reaction mixture is observed over a four to five hour period. Otherwise, it is difficult to separate photolevopimaric acid from the starting material.

We have found by experiment that α-terpinene opens up on ultraviolet irradiation, yielding the corresponding conjugated triene trans-2-methyl-5-isopropyl-hexatriene-(1.3.5), useful as a new vinyl monomer, and readily copolymerizable in the presence of free radical initiators to give useful copolymers with such monomers as styrene, acrylonitrile, methyl acrylate, and methyl methacrylate.

Palustric acid, on irradiation with ultraviolet light in benzene solution was found to yield the bridged compound as expected as indicated by the loss of conjugated unsaturation and the failure of absorption characteristic of a conjugated triene to develop.

The irradiation of a solution of levopimaric acid with ultraviolet light, in the presence of a continued excess of oxygen was found to yield a mixture of dehydroabietic acid, hydroperoxides, and transannular peroxides.

EXAMPLE 1

A solution of 0.906 g. of levopimaric acid in 30 ml. of absolute ethanol (0.10 M) was charged to a fused quartz actinometer cell 75 mm. in diameter, 10 mm. thick, of 32 ml. capacity and with a bottle mouth opening at the top. No effort was made to exclude air from the reaction mixture other than that the reactor was stoppered before irradiation was begun. The vessel was irradiated at a right angle to the face by an unfiltered Hanovia quartz high pressure mercury-vapor arc lamp, model 30600 (transmits from 185–400 m$\mu$) at a distance of 30 cm. The reaction was followed by the change in specific rotation and also by frequent determinations of the absorption spectrum from 220–320 m$\mu$. The reaction was found to be of zero order for the first three-quarters (45 hour irradiation) of the observable change based upon the change in specific rotation and the decrease in absorption at 272 m$\mu$, after which the rate progressively decreased to the final values (85 hour irradiation) $[\alpha]_D^{25}$ +40° and $\alpha$ 272 m$\mu$ 0.8, with no characteristic absorption from 220–320 m$\mu$ exhibited by the reaction mixture. Water was added short of turbidity and the solution allowed to stand. The product precipitated out to give 0.73 g. (81%) of crude material, M.P. 95–106°. One recrystallization from aqueous ethanol gave 0.42 g. (46%) of M.P. 112–114°.

The irradiation, when carried out with the same lamp equipped with a Vycor heat-deflecting filter No. 7910 and a nickel oxide filter No. 9863 (transmits 250–370 m$\mu$) at 10 cm. gave a solution of final $[\alpha]_D^{25}$+60 and on addition of water 0.62 g. (68%) of needles were obtained, M.P. 113–114.5°. One recrystallization from aqueous-ethanol gave 0.54 g. (60%) of M.P. 114.5–115°, unchanged on further recrystallization; $[\alpha]_D^{25}$ +79.2° (c.=0.97 in 95% ethanol); no characteristic absorption from 220–320 m$\mu$;

$\lambda_{max}^{alc.}$ 210, $\epsilon$ 3620, $\lambda_{max}^{Nujol\ mull}$ 12.13$\mu$, 12.41$\mu$ positive tetranitromethane test for unsaturation. Nuclear magnetic resonance spectra were run as 10% solutions in deuterated chloroform at 60 mc. employing tetramethylsilane as the internal reference with frequencies determined by the side band technique. No absorption was noted in the cyclopropyl ring proton region of $\tau$=9.2–10.0.

*Summary of Pertinent Bands in the Nuclear Magnetic Resonance Absorption Spectrum of Photolevopimaric Acid*

| Hydrogen Assignment | $\tau$ |
|---|---|
| Vinyl hydrogen | 4.25 (1)a (center of multiplet). |
| Tertiary allylic hydrogen on C-18 | 7.25 (1)a (broad band). |
| Tertiary allylic hydrogen at C-6 | 7.70 (1)a (center of triplet). |
| Ring hydrogens | 8.0–8.5. |
| Hydrogens on C-16 methyl | 9.66 (3)a (singlet). |
| Hydrogens on C-17 methyl (angular) | 8.87 (3)a (singlet). |
| Hydrogens on C-19 and C-20 methyls | 8.87 and 8.88 (3)a (doublet overlapping C-17 singlet). 8.98 and 9.02 (3)a (doublet). | a Numbers in parentheses indicate number of protons represented by the peak.

The structure of photolevopimaric acid is thus

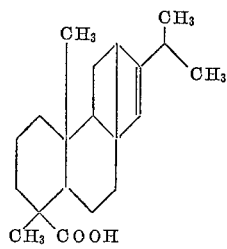

*Analysis.*—Calcd. for $C_{20}H_{30}O_2$: C, 79.4; H, 10.0; neut. equiv. 302. Found: C, 79.4, 79.5; H, 10.0, 10.1; neut. equiv. 304; molecular weight via the Signer method (E. P. Clark, Ind. and Eng. Chem., Anal. Ed., 13, 820 (1941)) in ether solution with levopimaric acid as the standard or reference compound: 302, 302.

The use of a red-purple filter No. 5874 (transmits 360–373 m$\mu$) with the above Hanovia lamp would not bring about a transformation of levopimaric acid to photolevopimaric acid.

Irradiation of an n-heptane or diethyl ether solution of levopimaric acid resulted in essentially the same changes in specific rotation and ultraviolet spectrum although the rate of change was somewhat slower.

The methyl ester of photolevopimaric acid was prepared employing diazomethane.

EXAMPLE 2

A sample of photolevopimaric acid was heated for 5 min. at 200° C. in an oil bath. The ultraviolet spectrum of the solid changed from one showing no selective absorption to one quite similar to that of thermally isomerized levopimaric acid.

A sample of photolevopimaric acid, weighting 0.128 g. was placed in a small test tube and immersed in a constant temperature oil bath at 120° C. The reaction was followed for 20 min. by the removal of small amounts of products at intervals and measurement of the ultraviolet spectrum over the range 220–320 m$\mu$. The conversion to levopimaric acid in 20 min. was 43.4% based on the value of $\lambda_{max}^{alc.}$ 272, $\alpha$=7.90

EXAMPLE 3

A sample of pure photolevopimaric acid weighing 0.30 g. was placed in a small test tube and immersed in a constant temperature oil bath for 40 min. The product, $\lambda_{max}^{alc.}$ 272 m$\mu$, $\alpha$ 12.19

(corresponds to a 67% conversion to levopimaric acid) was dissolved in a little alcohol and the levopimaric acid precipitated as the 2-amino-2-methylpropanol salt, 0.18 g. (46% yield in terms of conversion of irradiation product to levopimaric acid)

$\lambda_{max}^{alc.}$ 272 m$\mu$, $\alpha$ 13.43

(essentially pure). The salt was reslurried in 2 ml. of alcohol and acidified with 2 drops of acetic acid. A little water was added and the levopimaric acid precipitated. The acid was recrystallized once from alcohol-water and vacuum dried, wt. 0.08 g. (58% yield from salt); $[\alpha]_D^{26}$ −279° (c.=1.0 in ethanol), $\lambda_{max}^{alc.}$ 272 m$\mu$, $\alpha$ 18.2 infrared spectrum essentially identical to the spectrum of pure levopimaric acid.

EXAMPLE 4

To a pre-reduced dispersion of 0.20 g. of 5% palladium on carbon in 35 ml. of absolute ethanol was added 0.40 g. of photolevopimaric acid. One equivalent of hydrogen was absorbed in 35 min.; essentially no further increase in hydrogen uptake occurred during the next 1.5 hr. The catalyst was removed by filtration and water added to the filtrate. On cooling a crystalline product came down, yield 0.27 g. (68%). This was dissolved in the minimum amount of boiling absolute ethanol; first crop; yield 0.05 g. (13%); M.P. 183–185° C. A few drops of water was added to the mother liquor and on cooling, second crop: yield 0.165 g. (41%); M.P. 153–155° C.

The high melting isomer was recrystallized from 95% ethanol: yield 0.022 g. (6%); M.P. 203–204° (unchanged on further recrystallization from alcohol) and remelted at 194.5–196.5°, and remelted again at 189–192°; $[\alpha]_D^{25}$ +65.2° (c.=0.43 in 95% ethanol); negative tetranitromethane test for unsaturation.

*Analysis.*—Calcd. for $C_{20}H_{32}O_2$: C, 78.9; H, 10.6; neut. equiv. 304.5. Found: C, 79.1; H, 10.4; neut. equiv. 304.5.

The low melting isomer was recrystallized from aqueous ethanol: yield 0.105 g. (26%); M.P. 155.5–156.5° C. (unchanged on further recrystallization from ethanol) and remelted at 153.5–155.5° C., and remelted again at 153–155° C.; $[\alpha]_D^{26}$ +42.8° (c.=0.77 in 95% ethanol); no appreciable end absorption through 205 m$\mu$; no strong bands in the 11.75–12.75$\mu$ region; negative tetranitromethane test for unsaturation.

*Analysis.*—Calcd. for $C_{20}H_{32}O_2$: C, 78.9; H, 10.6; neut. equiv. 304.5. Found: C, 79.1; H, 10.6; neut. equiv. 303.

EXAMPLE 5

A 1.0 g. sample of the low melting diastereomer (see Example 4) from the hydrogenation of photolevopimaric acid was placed in a small centrifuge tube, flushed with nitrogen, stoppered, and heated in an oil bath at 160° C. for 40 min. The melt was crystallized from absolute alcohol, wt. 0.70 g. (70% recovery), M.P. 153–155.5 C.

EXAMPLE 6

A 0.68 g. sample of the high melting diastereomer (see Example 4) from the hydrogenation of photolevopimaric acid was placed in a small centrifuge tube, swept with nitrogen, stoppered, and heated in an oil bath for 5 min. at 207° C. The melt was crystallized from absolute alcohol, yield 0.55 g. (81%), M.P. 183–196° C. The crystals were washed twice with 95% ethanol and redried, yield 0.42 g. (62%), M.P. 196–200° C.

EXAMPLE 7

A solution of 30.5 g. (0.1 mole) of photolevopimaric acid in 3000 ml. of absolute methanol is treated at −70° C. with ozone from an ozone generator. Ozone uptake ceased in 60 min. (exit gases turned potassium iodide-starch solution blue) which amounts to exactly 1 mole ozone/mole photolevopimaric acid based on the known output of the generator. Water (2000 ml.) is added and a white crystalline ozonide came down. More methanol (1000 ml.) is added to bring all solids into solution. The Dry Ice bath is exchanged for an ice bath (0° C.) and about 30 g. of chlorine gas passed into the solution, which solution is then stored in the refrigerator overnight. Twenty-three hours later, the excess chlorine is stripped off under strongly reduced pressure and two days later, the methanol is stripped off under strongly reduced pressure. The product crystallized out, was collected by filtration and dried, wt. 31 g. (86%), M.P. 198° C. with dec. and evolution of gas;

$$\lambda_{max.}^{Nujol\ mull}$$

no bands in 3$\mu$ region, broad carbonyl with shoulder at 5.80, good detail in fingerprint region; $[\alpha]_D^{25}$ +57.8° (c.=0.53 in 95% ethanol). Recrystallized from aqueous methanol; wt. 0.21 g.; $[\alpha]_D^{25}$ +62.3° (c.=0.43 in 95% ethanol); negative halide in sodium fusion; no characteristic absorption from 220–320 m$\mu$. Recrystallization from absolute methanol gave beautiful crystals $[\alpha]_D^{25}$ +63.7° (c.=0.46 in 95% ethanol) (±2°); $M_D$ +224.

*Analysis.*—Calcd. for $C_{20}H_{30}O_5$: C, 68.5; H, 8.6; neut. equiv. 172.2. Found: C, 68.3; H, 8.8; neut. equiv. 176.8.

A 2,4-dinitrophenylhydrazone of the above keto acid is prepared by the addition of 2.0 g. of the crude ketone to an aqueous-ethanol-sulfuric acid solution of 2,4-dinitrophenylhydrazine. After heating for a few minutes, the solution is allowed to stand over the weekend whereupon on scratching and chilling, a yellow flaky precipitate comes down; wt. 1.3 g. (43%), M.P. 174–176° C. dec. with evolution of gas. The 2,4-dinitrophenylhydrazine is recrystallized from aqueous ethanol, M.P. 175–177° C. dec. with evolution of gas;

$$\lambda_{max.}^{alc.}\ 366\ m\mu,\ \alpha\ 41.2,\ \epsilon\ 21{,}830$$

*Analysis.*—Calcd. for $C_{26}H_{34}O_8N_4$: C, 58.85; H, 6.5. Found: C, 58.4; H, 6.8.

The structure of the dibasic acid is thus

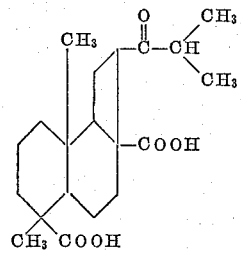

EXAMPLE 8

A modified styrenated polyester laminating resin is prepared by heating a mixture of 1 mole of the dibasic acid obtained by the oxidative ozonization of photolevopimaric acid (see above Example 7) with 2 moles of triethylene glycol in the presence of para-toluene sulfonic acid catalyst. One mole of fumaric acid is then added and the mixture heated until the acid number drops to about 50. To two parts of the resulting polyester is added one part of styrene by weight. To the resulting mixture is added 5% benzoyl peroxide by weight and the resin cured in the form of discs at 130° C. for 2 hours. The hard, tough plastic discs have a Barcol hardness of about 60. The dibasic acid modified styrenated polyester, when used in the preparation of glass laminates, exhibits superior wetting properties and provides laminates of good chemical resistance.

EXAMPLE 9

A solution of 0.816 g. of $\alpha$-terpinene (containing 1.1% of added 2,5-ditertiary-butyl hydroquinone as an inhibitor;

$$\lambda_{max.}^{alc.}\ 266\ m\mu,\ \alpha\ 51.4$$

in 30 ml. of absolute ethanol was placed in the quartz actinometer cell and irradiated with the unfiltered Hanovia lamp at a distance of 15 cm. from the rim of the lamp to the nearest edge of the cell. The cell was stoppered during the irradiation. A reaction took place which resulted in a steady increase in absorption in the ultraviolet region; the disappearance of the $\lambda_{max}$ 266 m$\mu$ and the appearance of $\lambda_{max}$ 252, 261, 271 m$\mu$. The central peak at 261 m$\mu$ was the major peak and a plot of $\alpha$ 261 m$\mu$-vs.-time gave essentially a straight line.

The irradiation of $\alpha$-terpinene has therefore resulted in an opening of the ring to give the new compound, trans-2-methyl-5-isopropyl-hexatriene-(1.3.5). The all-trans structure is indicated by the compound's ultraviolet absorption spectrum:

$$\lambda_{max.}^{alc.}\ 252,\ 261\ (major\ peak)$$

271 m$\mu$, since all-trans-2,5-dimethyl-hexatriene-(1.3.5) exhibits $$\lambda_{max.}^{alc.}\ 252,\ 261\ (major\ peak)$$

272 m$\mu$ [K. Alder and H. van Brochel, Ann., 608, 195 (1957)]. The triene prepared from $\alpha$-terpinene is useful as a new vinyl monomer and readily homopolymerizes and copolymerizes with monomers such as styrene, acrylonitrile, methyl acrylate, and methyl methacrylate to give useful resins. The structure of the new triene described herein is thus

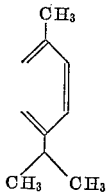

EXAMPLE 10

Palustric acid (0.398 g.) is dissolved in 330 ml. of benzene, the solution charged to the quartz cell described in Example 1 above, a stream of nitrogen passed through the solution for 7 minutes, and the cell stoppered and irradiation is started. Irradiation is carried out at a distance of 20 cm. with the Hanovia lamp described in Example 1 above. After 48 hours, the ultraviolet absorption maximum at 265–266 m$\mu$ ($\alpha$ 31.0), characteristic of palustric acid, is gone and no characteristic absorption is found from 220–320 m$\mu$. The reaction mixture was concentrated under reduced pressure and dried in vacuo over Drierite, weight 0.17 g. of friable solid. This product could not be crystallized and was thus dissolved in 2 ml. acetone, 4 drops of cyclohexylamine added, the precipitate collected by centrifugation, washed with pentane and dried over Drierite in vacuo; yield 0.09 g; $[\alpha]_D^{26}$ —3.96° (c.=1.77 in 95% ethanol), of the cyclohexylamine salt of the bridged compound of the following structure.

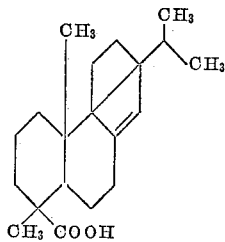

EXAMPLE 11

A solution of 1.51 g. of levopimaric acid in 25 ml. of absolute ethanol (0.2 M) was placed in a fused quartz actinometer cell and irradiated from a distance of 15 cm. with a Hanovia lamp containing filters transmitting light of 250–370 m$\mu$. A gas delivery tube was affixed extending to the bottom of the solution and a steady stream of oxygen passed through the solution during irradiation. Ethanol was added occasionally to keep the volume at 25 ml. The reaction was followed by the change in $[\alpha]_D^T$ and for the first 12 hrs. (about one half of the total observable change) the rate of change was independent of the concentration of resin acid. The rate then progressively decreased and leveled off after 48 hrs. at a value of $[\alpha]_D^{25}$ +16°; no characteristic absorption from 220–320 m$\mu$; 0.22 mole peroxide/mole resin acid charged. The solution was concentrated under a nitrogen stream and water added to turbidity; first crop 0.380 g.; second crop 0.18 g.; third crop 0.265 g. The mother liquor was then ether extracted and the ether extracts evaporated to dryness to yield a noncrystalline oil which exhibited

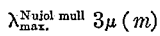

First crop: M.P. 145–145.5°; recrystallized from ethanol to give crop (a), wt. 0.15 g., M.P. 146–147°, $[\alpha]_D^{26}$ +64.7° (c.=0.82),

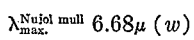

12.23$\mu$ (m), no band in 3$\mu$ region,

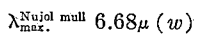

275 m$\mu$ ($\alpha$ 1.20), no peroxide. Crop (b), 0.13 g., $[\alpha]_D^{25}$ 61.8° (c.=0.66),

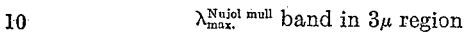

12.23$\mu$ (m), no band in 3$\mu$ region, no peroxide. Crop (c), 0.015 g.,

Second crop: M.P. 131.5–135° with dec. and evolution of gas, $[\alpha]_D^{26}$ +29° (c.=0.98), 0.164 equiv. titratable peroxide/equiv. resin acid,

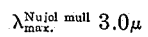

6.68$\mu$ (w), 12.25$\mu$ (s), treatment with excess bisulfite lowered peroxide content 40%, treatment with excess sodium hydroxide resulted in little change in absorption from 220–320 m$\mu$.

Third crop: $[\alpha]_D^{26}$ —12.7° (c.=0.827), 0.287 equiv. peroxide/equiv. resin acid,

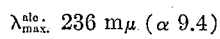

no bands in 6.7 nor 12.2$\mu$ regions, treatment with excess bisulfite lowered peroxide content 48%, treatment with an excess of base resulted in $\lambda_{max.}^{alc.}$ 236 m$\mu$ ($\alpha$ 9.4)

We claim:
1. A compound of the formula

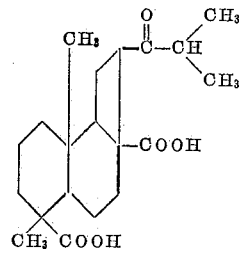

2. A process for preparing the compound of claim 1, which process comprises the following operations performed in sequence:
   (a) irradiation of levopimaric acid in an inert anhydrous organic solvent with ultraviolet light until the conjugated unsaturation characteristic of levopimaric acid has disappeared as evidenced by spectrophotometric analysis,
   (b) ozonolysis of the irradiated product of step (a) with a molecular equivalent quantity of ozone,
   (c) decomposition of the ozonide product of step (b).
3. The process of claim 2 wherein the irradiation is carried out at room temperature in absolute ethanol and with ultraviolet light of wave length 250–370 m$\mu$, the ozonalysis of the irradiated product is performed at —70° C. in absolute methanol solution and the ozonide is decomposed at 0° C. in aqueous methanol solution with chlorine gas.
4. The diastereomeric compound which has the formula

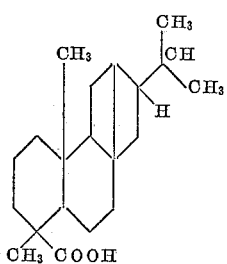

5. A process for producing the diastereomeric compound of claim 4 which comprises the steps of irradiating levopimaric acid with ultraviolet light and hydrogenating the irradiated product.

6. The process of claim 5 wherein the levopimaric acid is irradiated at room temperature in absolute ethanol solution with ultraviolet light of wave length 250–370 mµ until such time as the conjugated unsaturation characteristic of levopimaric acid has disappeared as evidenced by spectrophotometric analysis and the hydrogenating step is carried out in absolute ethanol solution with palladium on carbon catalyst.

No references cited.